United States Patent

Kelling

[15] 3,674,999

[45] July 4, 1972

[54] NUMERICAL FUNCTION GENERATOR

[72] Inventor: Leroy U. G. Kelling, Waynesboro, Va.

[73] Assignee: General Electric Company

[22] Filed: Oct. 22, 1970

[21] Appl. No.: 82,979

[52] U.S. Cl. ....................235/152, 235/150.31

[51] Int. Cl. ....................G06f 1/02

[58] Field of Search ....................235/151.11 I, 150.31, 152 IE, 235/150.3

[56] References Cited

UNITED STATES PATENTS 3,590,226 6/1971 Lane....................235/151.11

3,591,780 7/1971 Rosenfeld....................235/151.1

*Primary Examiner*—Eugene G. Botz

*Attorney*—William S. Wolfe, Frank L. Neuhauser, Oscar B. Waddell and Joseph B. Forman

[57] ABSTRACT

A numerical function generator for use with numerical control systems in generating linear and nonlinear numerical functions including circular and parabolic functions. The input data indicative of the desired numerical function is stored in two separate integrand registers which are individually associated with digital adders so that their contents can be selectively added to the contents of two separate accumulator registers. The contents of the two accumulator registers are compared by a bit comparator in order to indicate which of the two accumulator registers presently has the larger number stored therein. As a result of this comparison, the integrand register associated with the accumulator register having the smallest number is added to that accumulator register until such time as the situation reverses itself. At this time, the contents of the other integrand register are added to its associated accumulator register. Two separate pulse frequency digital signals are generated as a result of the addition operations referred to above. The basic function generator described heretofore is then modified so as to generate circular arcs by increasing the contents of one integrand register and decreasing the contents of the other integrand register as the function is generated. A further modification contemplates increasing (or decreasing) the contents of one integrand register while maintaining the contents of the other integrand register constant so as to generate parabolic arcs.

18 Claims, 11 Drawing Figures

INVENTOR.
LEROY U. C. KELLING
BY Michael Masnik
HIS ATTORNEY

*INVENTOR.*
LEROY U.C. KELLING
BY Michael Masnik
HIS ATTORNEY

INVENTOR.
LEROY U.C. KELLING
BY Michael Masnik
HIS ATTORNEY

INVENTOR.
LEROY U. C. KELLING
BY Michael Masnik
HIS ATTORNEY 1. (CW·+X·+Y) (CCW·+X·−Y) (CW·−X·−Y) (CCW·−X·+Y) = Y₀ (DEC.) · X₀ (INC.)

V VI VII VIII 2. (CCW·+X·+Y) (CW·+X·−Y) (CCW·−X·−Y) (CW·−X·+Y) = Y₀ (INC.) · X₀ (DEC.)

INVENTOR.
LEROY U.C. KELLING
BY Michael Masnik
HIS ATTORNEY

INVENTOR.
LEROY U.C. KELLING
BY Michael Masnik
HIS ATTORNEY

INVENTOR.
LEROY U.C. KELLING
BY Michael Masnik
HIS ATTORNEY

NUMERICAL FUNCTION GENERATOR

BACKGROUND OF THE INVENTION

The present invention relates to numerical control systems for machine tools. More specifically, the present invention relates to an improved type of numerical function generator for use in such numerical control systems.

The development of numerical control systems for machine tools is well known. There are a variety of types of numerical control systems which utilize various control techniques. Chief, however, among the techniques for controlling the actual position of the machine tool are numerical control systems which fall into two main categories. These two categories are broadly referred to as numerical positioning controls and numerical contouring controls.

Numerical positioning controls define the desired end position of the numerically controlled machine tool by setting forth the desired end position in terms of coordinates. The actual path traveled by the numerically controlled machine from one position to the next is of no importance in most numerical positioning controls since the tool generally moves at a position away from the work until such time as it arrives at the desired end position.

Numerical contouring controls, on the other hand, are programmed in terms of the desired path which the numerically controlled machine tool is to follow going from one position to the next. Numerical contouring control systems are generally slated for utilization by machines such as lathes, boring mills, etc. in which the tool is in contact with the workpiece as the tool moves from one position to the other so that the path which the machine follows is of critical importance.

An essential part, therefore, of most numerical contouring control systems is the so-called function generator. The purpose of a function generator is to continuously generate the desired path which the controlled machine tool is to follow. In general, this is done by programming the instantaneous slope of the desired path by defining the two vectors (in a two axis control system) which combine to make up the desired path.

There are a number of known types of numerical function generators which have been utilized in numerical control systems of the prior art. One of these function generators is commonly referred to as a pulse rate multiplier. In a pulse rate multiplier function generator, the two digital numbers indicative of the desired path are stored in two separate registers. These registers are connected to a counter which is counted at a pulse frequency rate proportional to the desired path velocity. The registers and the counter are, in turn, connected to a plurality of gates so as to gate out two separate pulse strains proportional to the rate at which the counter is counting and the contents of these two storage registers. Without changing the contents of the registers, a function generator of this type can be used to generate normal linear functions. Variations of the contents of the registers during the generation process will result in generating other nonlinear functions.

A second well-known type of numerical function generator is the so-called digital differential analyzer. A digital differential analyzer function generator operates on essentially digital integration techniques well known in the prior art. In such a function generator, the two digital numbers indicative of the desired numerical function are stored in two separate storage registers. These two registers are commonly referred to as integrand registers and each have associated with it an accumulator or remainder register. A pulse frequency digital signal proportional to the desired path velocity is used to cause the contents of each of the integrand registers to be continuously added to its associated remainder register. Operation continues in this fashion until the contents of the remainder register exceeds its capacity and overflow pulses are generated as a result thereof. The overflow pulses from each remainder register are then utilized as two separate pulse frequency digital signals proportional to the desired path velocity. Without affecting the numbers stored in the integrand registers, a digital analyzer function generator will generate linear functions whereas certain modifications of the contents of the integrand registers during generation allows the generation of other nonlinear numerical functions.

A third type of numerical function generator is the so-called "zig-zag" function generator. In this type of function generator, the digital numbers relating to the desired numerical function are stored, once again, in two separate storage registers. These two storage registers are associated with an adder-subtracter unit which, in turn, is associated with a single accumulator register. The contents of the two storage registers are alternatively added to or subtracted from the contents of the accumulator register with the decision as to whether to add or subtract being made based upon the sign of the present contents of the accumulator register. That is, the contents of one storage register will be added to the accumulator register until the contents of the accumulator register is of some positive value. At this point, the contents of the other storage register will be subtracted from the contents of the accumulator register until such time as the contents of the accumulator register become negative. Continuous operation in this way without varying the contents of either of the storage registers results in the generation of a linear function whereas modification of the contents of the two storage registers during generation allows the generation of other nonlinear numerical functions.

SUMMARY OF THE INVENTION

The present invention relates to a numerical function generator which operates so as to generate both linear and nonlinear functions by storing two digital numbers indicative of the instantaneous slope of the function to be generated. These two digital numbers are alternatively added to the contents of two separate accumulator registers whose contents are, in turn, compared to ascertain which of the two accumulator registers has the highest value. As a result of this comparison, the digital number which has been added to the accumulator register having the lowest value is once again added to that accumulator register until such time as its accumulator register exceeds the value of the other accumulator register. At this time, the operation is reversed. In addition to linear functions, the present invention contemplates the generation of nonlinear functions including circular and parabolic functions by modifying the two initial digital numbers which were programmed as indicative of the initial instantaneous slope of the desired function.

BRIEF DESCRIPTION OF THE DRAWINGS

While the specification concludes with claims particularly pointing out and distinctly claiming the subject matter which is regarded as the invention, an illustration of several particular embodiments can be seen by referring to the specification in connection with the accompanying drawings in which:

FIG. 5(*b*) is a graph depicting the actual numerical function generated as a result of the waveforms of FIG. 5(*a*);

DESCRIPTION OF THE PREFERRED EMBODIMENTS

The present invention is particularly suited for generation of numerical functions necessary for the control of automatic machine tools. Therefore, before turning to a detailed description of the preferred embodiments of the present invention, it will be appropriate to briefly set forth the background in which such numerical function generators operate.

Figure 1:
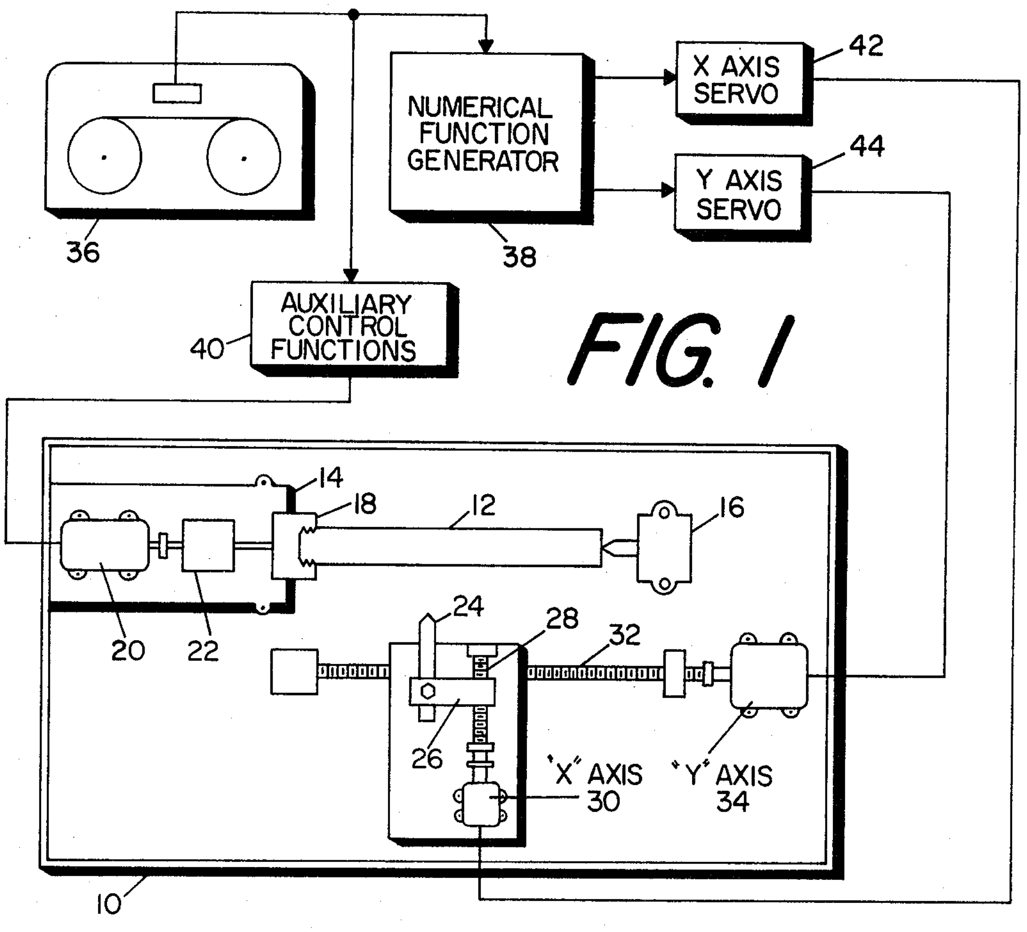
FIG. 1 is a block diagram of a simplified version of a general numerical contouring control system.

Referring then to FIG. 1, there is shown a block diagram illustrating very briefly some of the functions ordinarily performed by a numerical control system. The brief control system of FIG. 1 is shown in conjunction with an exemplary machine tool 10 such as a convention lathe. The function of the engine lathe 10 is, as is well known, to make desired machining operations on a rotating workpiece 12. The rotating workpiece 12 is mounted between a headstock 14 and a tailstock 16. The workpiece 12 will ordinarily be mounted in a chuck 18 which secures the workpiece.

The rotating workpiece 12 is caused to rotate by a spindle drive motor 20. The spindle drive motor 20 may be directly connected to the chuck 18 or may be driven through a variable gear box 22.

As is well known, the type of part which will result from operation of the lathe 10 is controlled by controlling the position of the cutting tool 24. The cutting tool 24 is mounted in a tool post 26 which is, in turn, connected via a ballscrew (not shown) to a lead screw 28. The lead screw 28 is, in turn, connected to a drive motor 30. A brief review of these elements shows that rotating the motor 30 causes the lead screw 28 to rotate which, in turn, causes the cutting tool 24 to move in and out with respect to the rotating workpiece 12. For the sake of convenience, movement in this direction will be referred to as X-axis.

In order to move the cutting tool 24 parallel to the rotating workpiece, the X axis drive motor 30 and its associated mechanical components are mounted on a second lead screw 32. The second lead screw 32 will be connected to a second drive motor 34 such that rotation of the drive motor 34 causes the lead screw 32 to rotate which results in moving the cutting tool 24 parallel to the rotational axis of the workpiece 12. Similarly, for the sake of convention, movement of the cutting tool 24 in a direction parallel to the rotating axis of the workpiece 12 will be referred to as motion in the Y-axis.

The control system which controls the operation of the drive motors 30, 34 includes a source of input data such as the punched tape reader 36. In control systems of this type, the input data which defines the various functions of the machine tool may be coded, for example, in punched paper tape, magnetic tape or punched cards.

The data from the data source 36 is fed to a variety of locations throughout the control system, many of which have been omitted from FIG. 1 for the sake of simplicity. One of the primary functions, however, of such a control system is to generate numerical functions which define the part geometry. For this reason, the output of the data source 36 is connected to a numerical function generator 38. In addition to the numerical function generator 38 there is shown in brief block form a portion of the remainder of the control system which includes the control over auxiliary functions shown in block 40. Among the auxiliary functions control may be such things as the speed of the rotating workpiece, the selection of appropriate cutting tools, provision for coolant, etc.

The numerical function generator 38 is adopted to receive numerical input data from the data source 36 and convert that input data to a convenient form for moving the machine tool in accordance with the programmed information. Thus, for example, the numerical function generator 38 may be required to accept numerical input information and generate therefrom two pulse streams, the relationship between the pulse streams being the desired path of the cutting tool. This path may be either a straight line, a circular arc, or a parabolic function.

For the purposes of the present explanation, it suffices to say that the output of the numerical function generator 38 is connected to the X-axis servo 42 and the Y-axis servo 44 which are, in turn, connected to their respective associated drive motors.

From the brief explanation above, it can be seen that the numerical function generator forms an important part of a numerical control system since it is the portion of the system which generates the numerical functions necessary to cause the machine tool to move in accordance with the desired part geometry.

Before turning to a detailed description of a preferred embodiment illustrated in FIGS. 2–10, it will be necessary to set forth a few preliminary remarks concerning digital logic systems.

The preferred embodiments of the present invention will be illustrated with respect to digital logic systems. In such systems, there are two distinct signal levels. One of these signal levels will be referred to hereinafter as logic "1" and may be represented by a relatively high voltage such as +6 volts. The other logic level will be referred to as logic "0" and will be represented by a lower voltage such as 0 volts.

Figure 2:
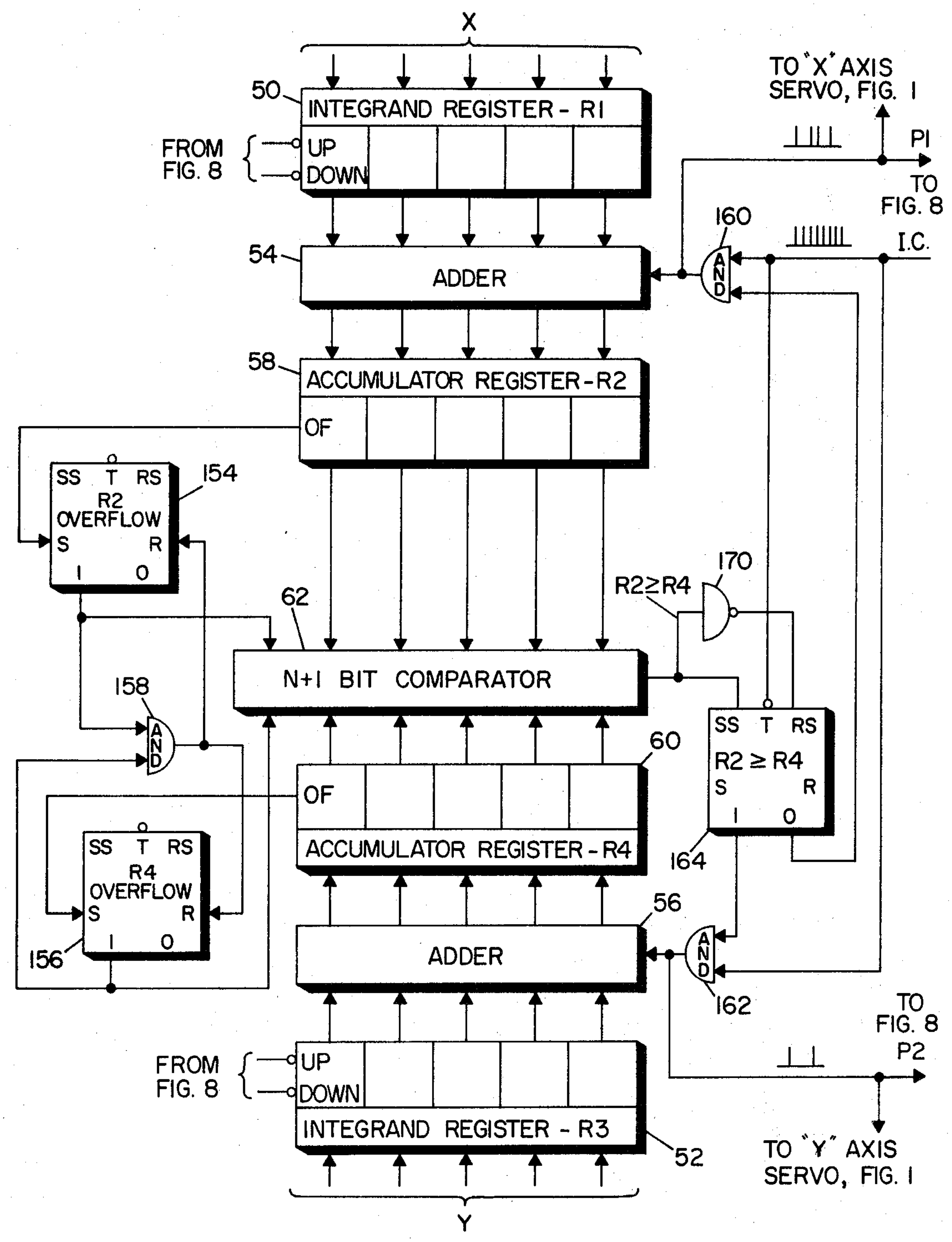
FIG. 2 is a combination block and logic diagram of a first embodiment of the numerical function generator comprising the present invention.

In the embodiments illustrated in FIGS. 2–10 there are shown a number of common logic elements whose operation will be described briefly. The logic element denoted with reference numeral 160 in FIG. 2 is a simple AND gate. AND gate 160 may have any number of inputs (designated by the arrows). The operation of AND gate 160 is such that its output will go to logic "1" if and only if all of the inputs are at logic "1." Under all other input conditions, the output of AND gate 160 will be logic "0."

Figure 3:
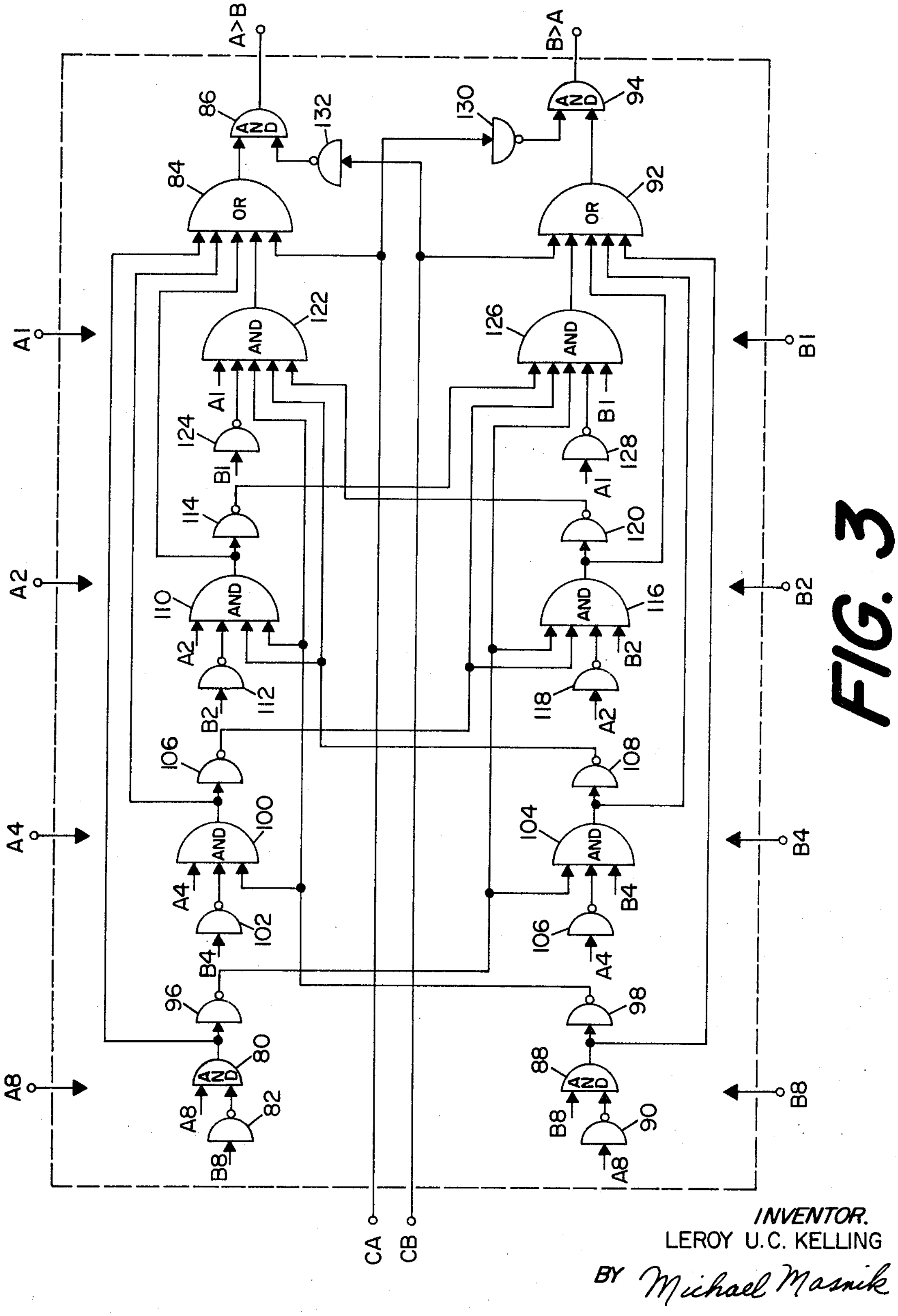
FIG. 3 is a detailed logic diagram of a one digit bit comparator.

The logic symbol denoted with reference numeral 82 in FIG. 3 is a simple inverter. As is well known, inverter 82 operates such that its output (denoted by the circle) will be a will be a logic "1" when its input (denoted by the arrow) is a logic "0" and vice versa.

The logic symbol denoted with reference numeral 164 in FIG. 2 is a simple steered flip-flop. It has three input terminals labeled "SS," "RS" and "T." The "SS" input terminal is the set steering input, the "RS" input terminal is the reset steering input and the "T" input terminal is the trigger terminal. A logic "1" on the "SS" input terminal followed by a signal going to logic "0" (as indicated by the circle) on the "T" input terminal will cause flip-flop 164 to assume the set state. Similarly, a logic "1" on the "RS" input terminal followed by a signal going to logic "0" on the "T" input terminal causes flip-flop 164 to assume the reset state. Flip-flop 164 also has two additional inputs labeled "S" and "R." These two inputs are the direct set and reset input terminals. Application of a logic "1" to the "S" input causes flip-flop 154 to assume the set state. Conversely, application of a logic "1" to input "R" causes flip-flop 154 to assume the reset state. The present state of flip-flop 154 is indicated by its two output terminals labeled "1" and "0." These labels are used to indicate the logic signal present at these outputs when flip-flop 154 is in the set state. That is, the "1" output terminal will be a logic "1" when flip-flop 154 is set and the "0" output terminal will be a logic "0." When flip-flop 154 is in the reset state, the logic signals present at these two output terminals will be reversed so that the "1" output terminal will be a logic "0" and the "0" output terminal will be a logic "1."

The logic element denoted with reference numeral 84 in FIG. 3 is a simple OR gate. OR gate 84 operates such that its output will be a logic "1" if any one or more of its inputs are logic "1" Thus, OR gate 84 is a simple nonexclusive OR gate of the well-known type.

These logic symbols will be used throughout the description of the preferred embodiments as set forth in FIGS. 2–10.

Turning now to FIG. 2, there is shown a combination block and logic diagram of a preferred embodiment of the numerical function generator constituting the present invention. As was described hereinbefore, a numerical function generator operates by taking two digital numbers and generating first and second pulse frequency digital signals with the ratio of the pulse frequency digital signals being proportional to the ratio of the input digital numbers. The input digital numbers are, in turn, related to the desired numerical function in that the ratio of these digital numbers is selected so as to be proportional to the instantaneous slope of the function being generated.

In the embodiment of FIG. 2, the two digital numbers which define the function to be generated are indicated as "X" and "Y." These two digital numbers will be received from some type of data input source such as the tape reader 36 of FIG. 1. The digital numbers "X" and "Y" representing the characteristics of the desired numerical function are stored in first and second digital storage means such as the integrand registers made up of reversible counters 50, 52. The embodiment of FIG. 2 is illustrated with the digital numbers "X" and "Y" as five digit binary coded decimal numbers but it will be appreciated that any number of digits (and any coding scheme) will operate within the principles of the present invention.

As can readily be appreciated, any numerical function which is being generated for use in commanding the motion of a numerically controlled machine tool can be represented by a vector which is indicative of the instantaneous slope of the numerical function. This vector can be resolved into its "X" and "Y" components so as to define the instantaneous velocity of the two movable axes of the machine tool. The digital number "X," therefore, will be selected so as to be proportional to the instantaneous velocity of the machine tool in the "X" axis whereas the digital number "Y" will be selected so as to be proportional to the instantaneous velocity in the "Y" axis.

The digital number "X" is relayed from the data input source to the reversible counter 50 which acts as a first digital storage means. The reversible counter 50 is illustrated as a five digit reversible counter of the well-known type. Briefly, a reversible counter of this type is equipped to accept input information which can then be modified (either by increasing or decreasing) upon receipt of an appropriate input signal. Similarly, the digital number "Y" is fed to the reversible counter 52 which acts as a second digital storage means and will be similar to the reversible counter 50 as described above. In order to correspond to terminology which has been utilized with respect to prior art types of numerical function generators, the reversible counter 50 is labeled Integrand Register - R1 and the reversible counter 52 is labeled Integrand Register - R3. These registers are referred to as integrand registers since the general operation of digital numerical function generators is to carry out the necessary steps of digital integration and the number stored in these two registers must therefore form the integrands for this process.

Reversible counters 50, 52 are connected to first and second digital adders 54, 56 respectively. The digital adders 54, 56 are, in turn, connected to a pair of accumulator registers 58, 60 respectively. Briefly, these elements are interconnected such that activation of adder 54 causes the digital number stored in reversible counter 50 to be added to the present contents of the accumulator register 58. Similarly, activation of digital adder 56 causes the digital number stored in reversible counter 52 to be added to the present contents of the accumulator register 60.

The precise way in which the adders 54, 56 and the accumulator registers 58, 60 are constructed is largely a matter of design choice and will depend in part upon the basic type of numerical control system in which the present invention is utilized. There are at least two distinct types of numerical control systems, each of which is readily available to utilize the numerical function generator of the present invention. The first type of numerical control system is referred to broadly as a parallel control system. In this type of system, as illustrated, for example, in U.S. Pat. No. 3,449,554 issued to the inventor of the present application and assigned to the assignee of this invention, the input data which is held and acted on by the system is stored in a plurality of separate individual storage registers which are interconnected so as to make up the basic control system. This type of control system is to be contrasted with a serial data system of the type illustrated by U.S. Pat. application, Ser. No. 709,242, filed Feb. 29, 1968, and assigned to the assignee of the present invention. In a serial system of that type, data is stored in a recirculating storage loop, which may include, for example, a delay line rather than in a plurality of separate storage areas as is true in the parallel type system.

If the present invention is to be utilized in the parallel data storage type of numerical control system, a parallel adder of the well-known type will suffice for the adders 54, 56 shown in FIG. 2. Similarly, a parallel accumulator of the type normally associated with a parallel adder of this type will suffice for the accumulator registers 58, 60. An example of a parallel adder and associated accumulator register can be found in R. Richards, "Arithmetic Operations in Digital Computers" (Von Nostrand 1955), particularly FIGS. 4–13 on page 101. If, on the other hand, the present invention is to be utilized in a serial type control system, a serial adder of the type shown in U.S. Pat. application, Ser. No. 709,404, filed Feb. 29, 1068, by the present inventor will suffice.

In any event, the basic function of the adder 54 and accumulator 58 is to take the number stored in reversible counter 50 and add that number to the present contents of accumulator register 58 on a continuous basis each time the adder 54 is activated.

The contents of the accumulator registers 58, 60 are both fed to a bit comparator 62. The function of the bit comparator 62 is to examine the contents of the accumulator registers 58, 60 and generate an output signal indicating which of these two numbers is larger. Thus, bit comparator 62 will examine the contents of accumulator registers 58, 60 and generate an output signal labeled "R2 ⩾ R4." This signal will be a logic "1" if the contents (R2) of accumulator register 58 are greater than or equal to the contents (R4) of accumulator register 60.

The particular form of bit comparator 62 is largely a matter of design choice and any of several well-known types of bit comparators will suffice. In particular, the precise type of bit comparator to be used will depend upon the type of coding used for the data in the numerical control system. Looking briefly at FIGS. 3 and 4, there is shown a detailed logic diagram of a particular bit comparator which will suffice for data stored in binary coded decimal form. Thus, FIG. 3 is a detailed logic diagram of a one digit binary coded decimal bit comparator. The bit comparator of FIG. 3 will examine two input digital numbers (denoted A and B, coded in binary coded decimal form) and indicate whether A is greater than B or B is greater than A. The two input digital numbers are represented by their four binary bits which are coded as A8, A4, A2, A1 and B8, B4, B2, B1. The signal A8, therefore, represents the fourth or most significant binary bit of a binary coded decimal number, the signal A4 indicates the third binary bit, etc. For the purposes of simplicity, the actual interconnections between the input numbers and the gates comprising the bit comparator have been omitted with the signals themselves being shown as the input to the various gates.

Briefly, the bit comparator of FIG. 3 operates so as to examine each bit of a binary coded decimal digit in series beginning with the most significant bit, looking for a condition which would indicate that one digit is larger than the other. Thus, AND gate 80 has the most significant bit of the number A (the signal A8) as one of its inputs. The other input to AND gate 80 comes from an inverter 82 which has the most significant bit of the number B (the signal B8) as its input. Note that if the signal A8 is a logic "1" and the signal B8 is a logic "0," this automatically means that the number A is greater than the number B. This follows since a logic "1" at the most significant bit would indicate that the number A is at least 8 whereas the absence of a logic "1" at the most significant bit of the B number indicates that the B number is at most 7. Under these circumstances, both inputs to AND gate 80 will be logic "1" so that the output of AND gate 80 will be logic "1." This signal is relayed to form one input of an OR gate 84. Thus, the output of OR gate 84 would then be a logic "1." The output of OR gate 84 forms one of the inputs to AND gate 86. For the purposes of the present explanation, it will be assumed that the other input to AND gate 86 is also logic "1." Under these circumstances, the output of AND gate 86 will be a logic "1" indicating that the A number is greater than the B number so that the signal "A > B" goes to logic "1" to provide this indication.

If, on the other hand, the most significant bit of the B number (B8) is a logic "1" and the most significant bit of the A number (A8) is a logic "0," then it is equally clear that the B number is greater than the A number. This is detected by AND gate 88 which has the signal B8 as one of its inputs with the signal A8 being fed through an inverter 90 to its other input. Since B8 was assumed to be a logic "1" and A8 a logic "0,"the output of AND gate 88 will be a logic "1." The output of AND gate 88 is fed to one input of OR gate 92 whose output will similarly go to logic "1." Since the output of OR gate 92 is connected to AND gate 94, one of the inputs to AND gate 94 will be logic "1" under these circumstances. As before, assuming that the other input to AND gate 94 is also a logic "1," the output of AND gate 94 will go to logic "1." This causes the signal "B > A" to go to logic "1" indicating that the number B is greater than the number A.

If, however, the most significant bit of the numbers A and B are the same, it will be necessary to examine the next bit in order of significance. First, note that the output of gates 80 and 88 will both be logic "0" if the most significant bits of the A and B numbers are the same. The output of AND gate 80 is connected to an inverter 96 whereas the output of AND gate 88 is connected to an inverter 98. The outputs of both these inverters will be logic "1" under these circumstances. These signals are cross-connected to the gates which examine the remaining bits of the two binary numbers being examined. Thus, AND gate 100 and its associated inverter 102 function to detect whether the A number is greater than the B number at the next-to-most significant bits. Similarly, AND gate 104 and its associated inverter 106 operate to see if the B number is greater than the A number at the next-to-most-significant bit level. These two gates are cross-connected to the remaining bits by way of inverters 106, 108.

Examination of the two remaining bits of the A and B numbers takes place in an identical fashion with AND gate 110, its associated inverters 112, 114 checking the second bits (A2, B2) of the A and B numbers to see if A is greater than B and AND gate 116 with its associated inverters 118, 120 examining the same bit to see if the B number is greater than the A number. Finally, AND gate 122 with its associated inverter 124 checks the least significant bits (A1, B1) to see if A is greater than B whereas AND gate 126 and its associated inverter 128 check the least significant bit to see if the B number is greater than the A number.

Finally, the bit comparator of FIG. 3 is equipped to be serially connected with other bit comparators of identical construction so as to form a multi-bit comparator. For this reason, the bit comparator of FIG. 3 is equipped with two additional inputs, labeled "CA" and "CB." The "CA" input will be provided with a logic "1" if examination of more significant digits has revealed that the number A is greater than the number B. Similarly, the "CB" input will be provided with a logic "1" if examination of more significant digits has indicated that the multi-digit number B is greater than the number A. For these reasons, input terminal "CA" is connected to one of the inputs of OR gate 84. This results in automatically assuring that the output terminal "A > B" goes to logic "1" so as to carry through the result of examination in a more significant digit. The input terminal "CA" is also connected to inverter 130 whose output is connected to AND gate 94 so as to disable AND gate 94 and prevent an erroneous indication indicating that B is greater than A as might result from the internal operation of the comparator on the particular digit being examined therein. For similar reasons, input terminal "CB" is connected to one input of OR gate 92 and is connected by inverter 132 to disable AND gate 86 in case the examination of more significant digits has revealed that B is, in fact, greater than A.

Figure 4:
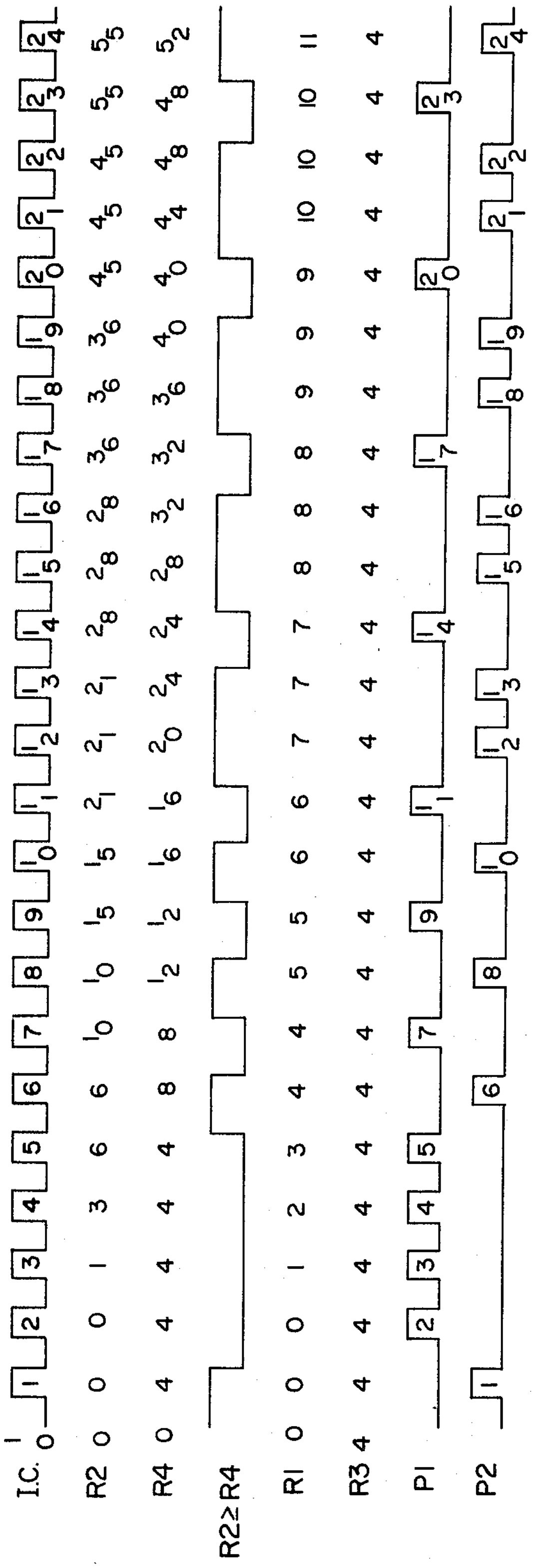
FIG. 4 illustrates utilization of a plurality of the bit comparators of FIG. 3 so as to constitute a multi-digit bit comparator of the type required by the system of FIG. 2.
Figure 4:
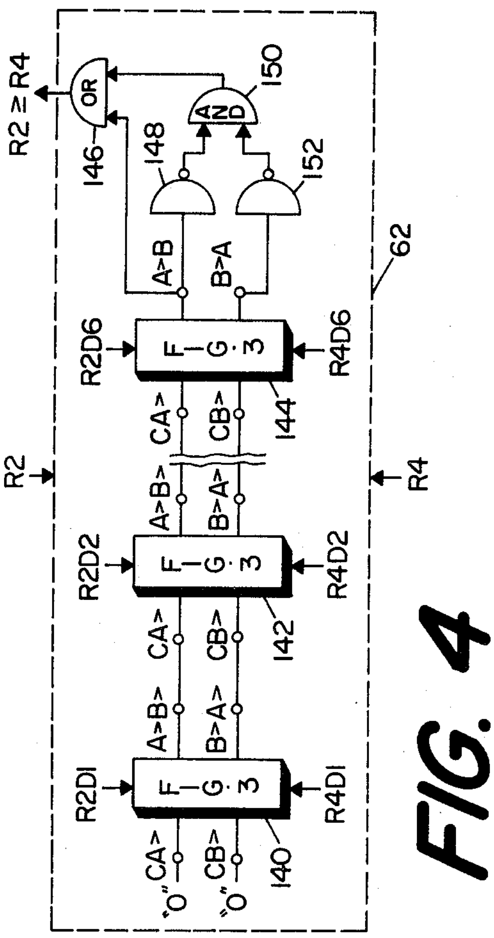

FIG. 4 is a brief block and logic diagram showing how the bit comparator of FIG. 3 can be interconnected to examine multi-digit binary coded decimal numbers as is required in the system of FIG. 2.

FIG. 4 illustrates the use of a plurality of the bit comparators of FIG. 3 so as to examine the multiple digit numbers utilized by the numerical function generator of FIG. 2. In FIG. 4 there is shown a plurality of bit comparators 140, 142, 144 connected in serial arrangement. The bit comparators are interconnected by connecting the "A × B" output terminals to the "CA" input terminals of the next bit comparator and by connecting the "B > A" output terminals to the "CB" input terminals of the next bit comparator. In this way, the output of the last bit comparator in the series will genuinely indicate whether the multiple digit number A is greater than B or B is greater than A (or in the actual application of FIG. 2 whether R2 is greater than R4 or R4 is greater than R2).

It will be recalled from the description of FIG. 2 that the actual output of the bit comparator used therein is the signal "R2 ≥ R4". This signal is generated by taking the "A > B" output terminal of bit comparator 144 and connecting it as one input to an OR gate 146. The signal "A > B" is also connected to an inverter 148 which is in turn connected to AND gate 150. The output terminal "B > A" is fed through a second inverter 152 to the other input of AND gate 150. The output of AND gate 150 is fed to the second input of OR gate 146. A brief examination of this circuit will reveal that the output of OR gate 146 will be a logic "1" if the input number R2 is greater than or equal to R4. That is, if R2 is greater than R4 then the signal "A > B" from bit comparator 144 will be a logic "1." Since this signal forms one of the inputs to OR gate 146, the output of OR gate 146 will also be a logic "1" under these circumstances. On the other hand, if the number R2 is equal to R4 then the signals "A > B" and "B > A" from bit comparator 144 will both be logic "0." Since both of these signals are inverted before being fed to AND gate 150, the output of AND gate 150 will be a logic "1" when R2 is equal to R4. Since this is also connected to one input to OR gate 146, it will be appreciated that the output of OR gate 146 will be a logic "1" under these circumstances since the effect of an indication that A is neither greater than B nor B is greater than A is the same as an indication that A is, in fact, equal to B (or in the particular application of FIG. 2 that R2 is equal to R4).

Returning now to FIG. 2, it can be seen that the output of bit comparator 62 will be a logic "1" anytime the contents of the accumulator register 48 is greater than the contents of the accumulator register 60. It will, however, be noted that the "1" output terminals of flip-flops 154, 156 are also connected to the bit comparator 62. The function of flip-flops 154, 156 is to make sure that the bit comparator 62 functions properly when an addition into one of the accumulator registers has caused that register to overflow its capacity. That is, suppose the accumulator register 58 goes from some relatively large number through 0 to some relatively small number as a result of an addition of the number stored in the reversible counter 50 to the present contents of the accumulator register 58. Under these circumstances, the apparent difference between the numbers stored in the accumulator registers 58, 60 would probably change. This would be incorrect and is compensated for by connecting "S" input of flip-flop 154 to the "OF" output of the accumulator register 58. The "OF" output of accumulator register 58 momentarily goes to logic "1" whenever the accumulator register 58 rolls over and generates an "overflow" pulse. This causes the flip-flop 154 to assume the set state thereby remembering that an overflow has taken place and assuring that the bit comparator 62 functions properly.

Similarly, flip-flop 156 has its "S" input terminal connected to the "OF" output terminal of accumulator register 60 so that flip-flop 156 will assume the set state whenever accumulator register 60 overflows.

When both accumulator registers 58, 60 have overflowed, it will be apparent that the bit comparator 62 can function properly by looking only at the contents of those two registers and that the flip-flops 154, 156 no longer need remember a previous overflow condition. Thus, when flip-flops 154, 156 both assume the set state, they will be reset by virtue of the fact that their "1" output terminals are connected to AND gate 158 whose output is, in turn, connected to the "R" input terminals of both flip-flops 154, 156. Thus, when both flip-flops assume the set state, the output of AND gate 158 will go to logic "1" which will cause them to reset since the output of AND gate 158 is connected to their "R" input terminal.

The present state of the output of the bit comparator 62 will be used by the embodiment of FIG. 2 to select which of the adders 54, 56 will be activated.

The rate at which the numerical function generator of FIG. 2 operates to generate the desired numerical function is controlled by an input pulse stream labeled "IC" and shown connected to one of the inputs to AND gates 160, 162. The output of AND gate 160 is connected to digital adder 54 and the output of AND gate 162 is connected to digital adder 56. Each time the signal "IC" goes to logic "1" one of these two adders will be activated so as to add the contents of its corresponding integrand register to its corresponding accumulator register. If the other input to AND gate 160 is a logic "1" then the output of AND gate 160 will go to logic "1" each time the signal "IC" goes to logic "1." Similarly, if the second input to AND gate 162 is logic "1" then the output of AND gate 162 will go to logic "1" each time the signal "IC" goes to logic "1." The second input to these two AND gates 160, 162 is connected to flip-flop 164 which is labeled "R2 ≥ R4." AND gate 160 is connected to the "0" output terminal of flip-flop 164 whereas AND gate 162 is connected to the "1" output terminal of flip-flop 164. Thus, it will be apparent that if flip-flop 164 is set, AND gate 162 will permit the "IC" signal to be gated through it to activate adder 56. Conversely, if flip-flop 164 is reset then the AND gate 160 will have a logic "1" on its second input so that the input signal "IC" will be gated through to activate adder 54.

The state of flip-flop 164 is controlled by operation of the bit comparator 62. The output signal of the bit comparator 62 is directly connected to the set steering input terminal "SS" of flip-flop 164. This same output signal is also connected to the reset steering input terminal "RS" of flip-flop 164 via inverter 170. Finally, the input signal "IC" is connected to the trigger terminal "T" of flip-flop 164. With these connections, it will be apparent that flip-flop 164 will be set if R2 is greater than or equal to R4 and will be reset if R4 is less than R2. Since flip-flop 164 is triggered when the input signal "IC" goes to logic "0,"flip-flop 164 changes state only when actual additions are not taking place since additions take place during the periods when the input signal "IC" is a logic "1."

Briefly, the operation of the numerical function generator of FIG. 2 can be summarized as follows. All four registers 50, 52, 58, 60 are initially at zero. The input data indicative of the desired function to be generated is transferred into the two integrand registers 50, 52. At this time, the contents of the accumulator registers R2 and R4 remain at zero so that the output of the bit comparator 62 is a logic "1" since R2 is equal to R4 at this time. The flip-flop 164 will be set and gate 162 will be activated so that at the next "IC" pulse the contents of the integrand register 52 are added to the contents of the accumulator register 60 by adder 56. At this time, the signal out of the bit comparator 62 changes to logic "0." This causes the flip-flop 164 to reset so that at the next "IC" pulse, adder 54 is activated so that it adds the contents of integrand register 50 to the accumulator register 58. At this time, the bit comparator indicates which of the two numbers stored in registers 58, 60 is greater and controls the operation of adders 54, 56 accordingly. From the foregoing, it can be seen that only one of the adders 54, 56 will ever be operating at the same time. As will be seen in detail hereinafter, the pulse streams feeding from gates 160, 162 to the adders 54, 56 are pulse frequency digital signals which are proportional to the input numbers Y and X so that these two pulse streams can be fed to the Y and X-axis servos of FIG. 1 so as to control the operation of the machine tool and cause it to move in response to the generated function.

Figure 5A:
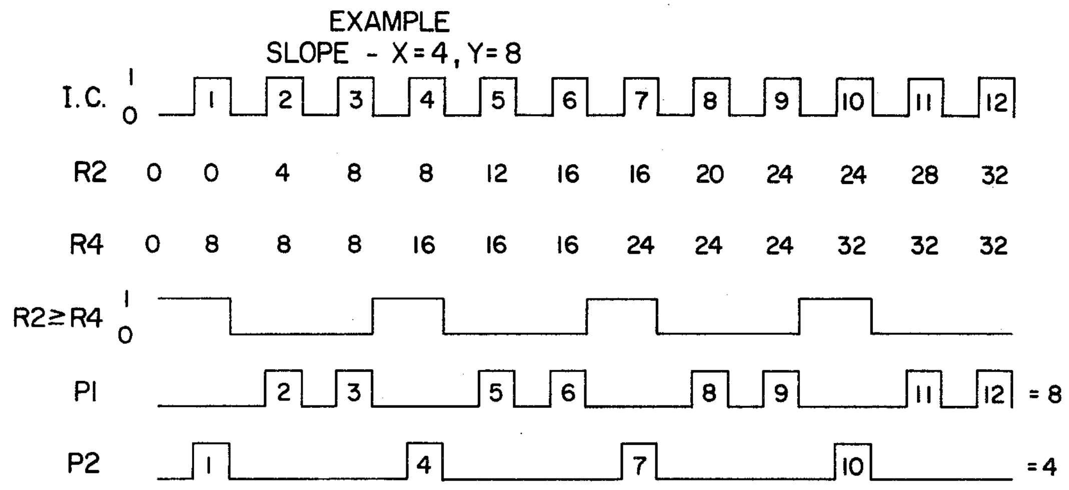
FIG. 5(*a*) is a series of waveforms illustrating the operation of the function generator of FIG. 2 for generating linear functions.
Figure 5B:
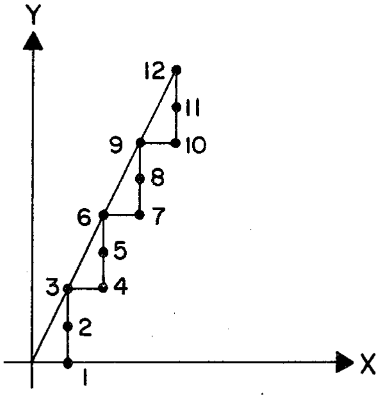

FIG. 5(*a*) is a series of waveforms illustrating the operation of the numerical function generator of FIG. 2 for generating a simple slope. The input information is $X=4$, $Y=8$ so that the slope commanded has a velocity in the Y axis which is twice the velocity in the X axis. The waveform labeled "IC" is the "IC" waveform which goes to gates 160, 162 of FIG. 2. This is followed by a series of numbers labeled "R2" and "R4" which indicates the present number being stored in the accumulator registers 58, 60 respectively. The next waveform labeled "R2≥R4" illustrates the state of flip-flop 164. Finally, waveforms "P1" and "P2" indicate the output of AND gates 160, 162 respectively.

The operation of the numerical function generator of FIG. 2 will now be explained with particular reference to the waveforms of FIG. 5(*a*). As was pointed out hereinbefore, the two integrand registers 50, 52 and the accumulator registers 58, 60 are initially reset to zero. The next step is to store the X and Y axis slope information in the appropriate integrand registers. Thus, the X axis information is stored in integrand register 50 and the Y axis information is stored in integrand register 52. Since the two accumulator registers 58, 60 are initially at zero, the output of bit comparator 62 is a logic "1" since R2 is equal to R4. Under these circumstances, the flip-flop 164 is initially set so that the first "IC" pulse (indicated with the number 1) in the "IC" pulse stream is fed through AND gate 162 to cause the contents of register 52 to be added to accumulator register 60. At this time, therefore, the contents of accumulator register 60 become the number 8 whereas the contents of accumulator register 58 stay at zero. Under these circumstances, the output of bit comparator 62 changes to logic "0" since R4 is now greater than R2. This, in turn, causes flip-flop 164 to reset when the signal "IC" goes to logic "0." With flip-flop 164 reset, the next "IC" pulse (numbered 2) is fed to AND gate 160 to activate adder 54 so as to add the contents of integrand register 50 to accumulator register 58. At the end of this step, register R2 now has a 4 stored therein and the contents of register R4 remain at 8. Since R4 is still greater than R2 at this time, the next "IC" pulse (numbered 3) is also fed through AND gate 160 so as to cause adder 54 to once again add the contents of integrand register 50 to accumulator register 58.

The operation of the numerical function generator of FIG. 2 continues in this fashion as shown in the remainder of the waveforms of FIG. 5(*a*). Detailed description of this operation is, therefore, deemed unnecessary since one need only follow the waveforms of FIG. 5(*a*) in conjunction with the function generator shown in FIG. 2 so as to verify the remainder of this operation.

Turning now to FIG. 5(*b*), the numerical function generated during the operation shown in FIG. 5(*a*) is graphically illustrated with respect to the two movable axes of the controlled machine tool. As can be seen, the stair-step type function generated by this function generator approximates the desired slope which was originally established by the X and Y input information. The actual slope is also illustrated and it can be seen that the desired slope never deviates more than one unit from the slope actually generated. It should be pointed out that while the actual slope generated appears to be somewhat rough and inaccurate, it is a necessary result of any digital numerical function generator that it can only generate slope by steps of a predetermined increment. In actual machine tool operations, each step will be extremely small, say 0.0001 inch so that what appears to be a rather rough approximation in the graph of FIG. 5(*b*) will, in operative fact, result in the generation of a very smooth surface when these pulses are applied to an operating machine tool.

The numerical function generator of FIG. 2 has, heretofore, been explained solely with reference to straight line as the generated function. However, as will be seen by reference to FIGS. 6, 7 and 8, the numerical function generator of FIG. 1 can readily be modified so as to generate other nonlinear numerical functions.

Figure 6:
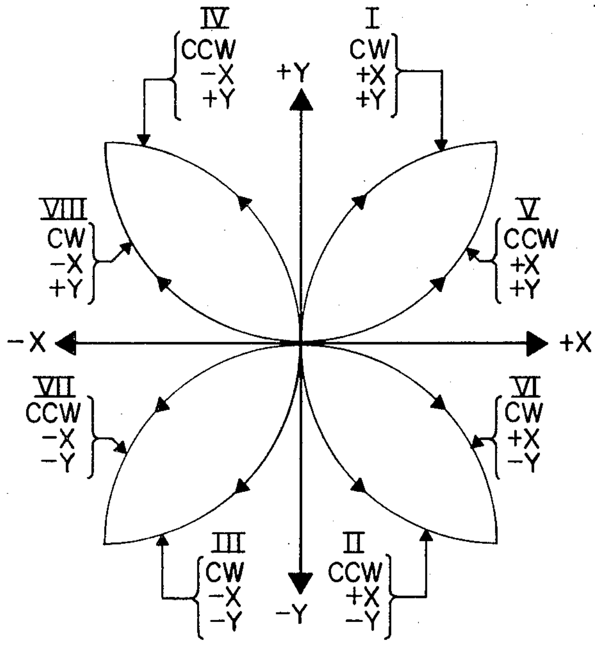
FIG. 6 is a graph indicating the eight possible circular arcs which can be generated by a numerical function generator.
Figure 8:
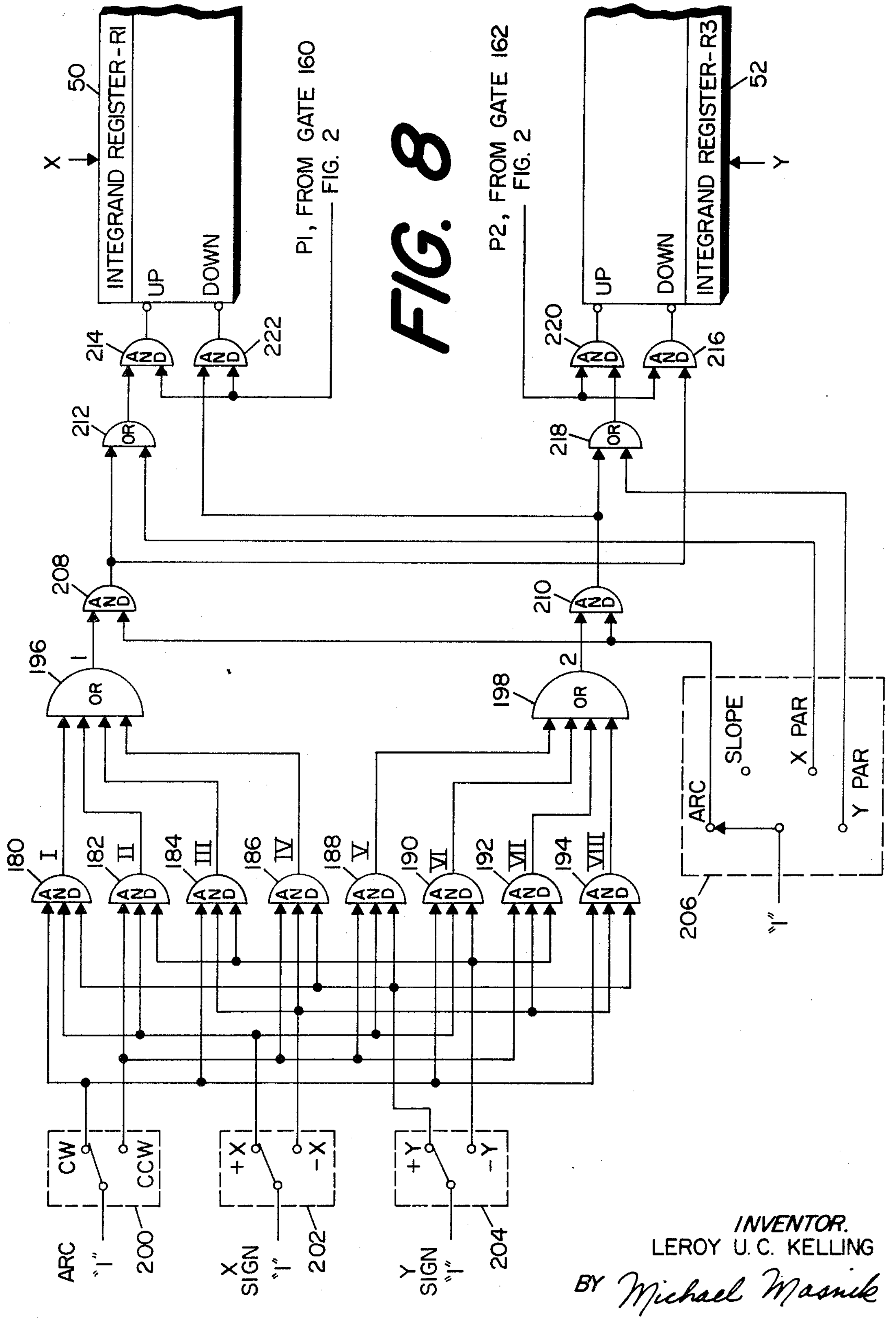
FIG. 8 is a logic diagram illustrating one embodiment of a modification of the basic function generator of FIG. 2 so as to generate linear, circular and parabolic arcs.

As will be seen with reference to FIG. 8, the numerical function generator of FIG. 2 can be modified so as to generate circular arcs. Before turning to FIG. 8, reference will now be made to FIG. 6 which shows the eight possible circular functions which can be generated by a numerical function generator. Brief reference to FIG. 6 shows that there are eight possible arcs which can be generated; two in each of the four quadrants, one in the clockwise direction and one in the counterclockwise direction. Assuming for simplicity that each of these arcs is to start at the origin and rotate outwardly therefrom, it will be appreciated that the initial slope of each such arc will be the result of velocity components of some fixed magnitude (proportional to the radius) in one axis and zero in the other. It will further be appreciated that as the generated arc swings through a full 90° rotation, the slope changes until finally the axis which had an initial velocity of zero has a velocity of some magnitude proportional to the radius while the axis which had an initial velocity will terminate at zero velocity.

With specific reference to FIG. 6, the arc identified with I is a clockwise arc into the first quadrant. At the origin, the magnitude of the velocity in the Y-axis will be some fixed amount whereas the initial magnitude of the velocity in the X-axis will be zero. As this arc rotates through its 90 degrees of revolution, the final conditions will be such that the magnitude of the velocity in the Y-axis decreases to zero whereas the magnitude of the velocity in the X-axis increases to a final amount equal to the initial velocity in the Y-axis at the origin. On the other hand, reference to the other arc in the first quadrant, i.e., the arc identified by V, shows that the conditions are reversed. That is, the initial velocity is all in the X-axis and terminates all in the Y-axis. From this brief explanation of arc generation and from the previous methods of arc generation which are known in the art, it will be apparent that a numerical function generator capable of generating circular arcs must be capable of:

1. Accepting initial information proportional to the instantaneous slope of the generated arc.
2. Modifying the initial information as the arc is generated by increasing the number stored in one of the storage registers and decreasing the number stored in the other storage register.

The selection of the proper techniques of increasing and decreasing instantaneous slope is a necessary function of any numerical function generator capable of generating circular arcs. As can be seen from FIG. 6, there are two possible situations: either the initial information in X must be increased and the initial information in Y decreased or the initial information in Y must be increased and the initial information in X decreased. The two relationships set forth immediately below the graph in FIG. 6 designate the particular arcs in that figure and which of these two possible techniques is to be used. Thus, the arcs identified by I–IV are such that the initial information in Y is to be decreased during the generation of the arc whereas the initial information in X is to be increased. Conversely, the arcs identified by V–VIII are such that the initial information in Y must be increased and the initial information in X decreased during their generation.

Turning then to FIG. 8, there is shown a series of eight AND gates 180–194 and two OR gates 196, 198 which serve to mechanize the two relationships set forth at the bottom of FIG. 6. For the sake of simplicity, the particular arc being generated will be designated by the position of three switches 200, 202 and 204. Switch 200 is identified as the "ARC" switch, switch 202 is the "X SIGN" switch and switch 204 is the "Y SIGN" switch. The arc switch 200 identifies the rotational direction of the arc to be generated, i.e., either clockwise or counterclockwise. The "X SIGN" switch 202 indicates whether the arc is to rotate into the +X or −X direction and similarly the "Y SIGN" switch 204 indicates whether the arc is to rotate in the +Y or −Y direction. As can be seen from FIG. 8, these switches are interconnected to AND gates 180–194 so as to account for each of the eight possible conditions shown in FIG. 6. Thus, AND gate 180 mechanizes the relationship for identifying the arc identified by I, AND gate 182 mechanizes the relationship which identifies the arc labeled with II, etc. Since AND gates 180–186 are all connected to OR gate 196, it will be seen that the output of OR gate 196 is equivalent to equation 1 of FIG. 6. Similarly, since AND gates 188–194 are all connected to OR gate 198, it can be seen that the output of OR gate 198 is equivalent to the relationship defined by equation 2 of FIG. 6.

Finally, there is shown an additional switch 206 in FIG. 8 which is used to identify the particular type of numerical function to be generated. At this point, it should be made clear that the ordinary numerical control system will not use switches of the types shown by switches 200, 202, 204 and 206. Instead, the information which is portrayed by these switches would come from some data input source such as punched paper tape. However, for the sake of simplicity, the embodiment shown in FIG. 8 utilizes these switches since they are conceptually easier to see and explain.

Therefore, if switch 206 is in the "ARC" position, it will be seen that AND gates 208, 210 are activated so as to select the particular relationship desired. If one of the arcs identified by I–IV is programmed, it will be apparent that the output of OR gate 196 is a logic "1." As can be seen from equation 1 of FIG. 6, under these circumstances it is necessary to decrease the initial information relating to the Y-axis and increase initial information relating to the X-axis. This is done in the following fashion. If the output of OR gate 196 is a logic "1," then both inputs (and therefore the output of AND gate 208) are logic "1."The output of AND gate 208 forms one of the inputs to OR gate 212. The output of OR gate 212 is connected to one of the inputs of AND gate 214 so as to activate AND gate 214 under these circumstances. Similarly, the output of AND gate 208 is also connected to one of the inputs to AND gate 216 so that AND gate 216 is also activated at this time. Activation of AND gates 214 and 216 produces the following operative result. Since the output of AND gate 214 is connected to the "UP" input terminal of integrand register 50, it will be apparent that the contents of integrand register 50 (that is, the X input information) will increase as the desired arc is generated. Conversely, since the output of AND gate 216 is connected to the "DOWN" input of integrand register 52, it will be apparent that the contents of integrand register 52 (that is, the initial Y information) will decrease as the desired arc is generated. The actual way in which this generates a circular arc will be shown in detail hereinafter with respect to the waveforms of FIG. 10.

If, on the other hand, one of the arcs identified by V–VIII is desired, it will be apparent that the output of OR gate 198 will be a logic "1." The output of OR gate 198 is connected to the second input of AND gate 210 whose output will, in turn, also be a logic "1." The output of AND gate 210 is connected to one of the inputs of OR gate 218 whose output is, in turn, connected to one of the inputs of AND gate 220. Similarly, the output of AND gate 210 is also connected to one of the inputs of AND gate 222. A brief review of the connection of AND gates 220 and 222 reveals that during the generation of the arc the contents of the X integrand register 52 will be decreased since the output of AND gate 222 is connected to the "-DOWN" input of integrand register 50. Similarly, the output of AND gate 220 is connected to the "UP" of integrand register 52 so that the contents of this register will be increased during the generation of the desired arc.

Figure 7:
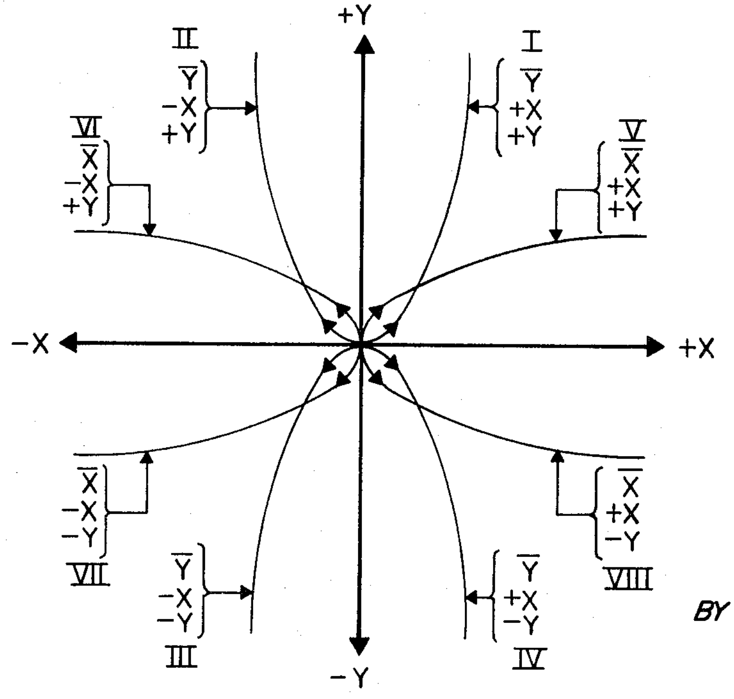
FIG. 7 is a graph indicating the eight possible parabolic arcs emanating from the origin which can be generated by a numerical function generator.

Before turning to a detailed explanation of how the combined function generator of FIGS. 2 and 8 generates circular arcs, attention will now be drawn to FIG. 7 so as to briefly describe a further function which can be generated by the basic function generator of FIG. 2.

Turning then to FIG. 7, there is shown a family of all possible parabolas with parabola or symmetric axes coincident with the X or Y coordinate axes which can be generated emanating outwardly from the origin. For the sake of simplicity, the present numerical function generator will be explained only with respect to such parabolas, i.e., those emanating outwardly from the origin with brief remarks hereinafter as to minor modifications which are necessary to generate parabolas in the opposite direction. The symbols used in FIG. 7 to identify the parabolas generated include the symbols + (or −) Y and + (or −) X which, as in the case of the arcs of FIG. 6, are used to indicate the quadrant the parabola rotates into. The third symbol used is either the letter X or the letter Y with a bar over the top. This symbol identifies the axis about which the generated parabola is symmetric. Thus, in FIG. 7, the parabolic arcs identified by I–IV are all symmetric about the Y axis. Similarly, the parabolic arcs identified by V–VIII are symmetric about the X-axis.

In the generation of parabolic arcs, it is well known that the slope of the velocity vector in one axis remains constant throughout the generation of the parabola whereas (in the case of the parabolas shown in FIG. 7 which emanate outwardly from the origin) the velocity vector in the other axis is continually increasing. Thus, it will be apparent from a review of FIG. 7 that the parabolic arc denoted by I is such that the velocity in the X direction remains constant throughout the generation of this arc while the velocity in the Y direction is continually increasing. Similarly, the parabolic arc denoted by V is such that the velocity in the Y-axis remains constant throughout its generation whereas the velocity in the X-axis is continually increasing. Indeed, reviewing all the possible arcs shown in FIG. 7 discloses that those parabolic arcs which are symmetric with the Y axis require increasing the velocity in the Y axis during their generation. Conversely, those parabolic arcs which are symmetric about the X-axis necessitate increasing the velocity in the X-axis during their generation.

Therefore, at least one possible way of generating parabolic arcs with the numerical function generator of FIG. 2 is to indicate the axis about which the parabola is symmetric and then cause the numerical function generator of FIG. 2 to increase the velocity in that axis during the generation of the parabolic arc while, at the same time, holding the velocity constant in the other axis. This is not to say that this is the only way in which such parabolic arcs can be identified for function generation purposes. Indeed, it may be more feasible in certain situations to identify the parabolic arc in a fashion similar to that used for generation of circular arcs, i.e., identification of the quadrant into which the arc rotates along with the direction (i.e., clockwise or counterclockwise) of rotation. However, for the sake of simplicity, the present invention will be explained by assuming that generated parabolic arcs are identified in the fashion shown in FIG. 7. That is, they will be identified according to the axis about which they are symmetric. With this type of identification, it is unnecessary for function generation purposes to indicate the quadrant into which they are rotating since the quadrant makes no difference insofar as the actual operation of the function generator itself is concerned.

Referring then to FIG. 8, it will be recalled that the selector switch 206 was used to indicate the type of numerical function being generated. Hereinbefore there has been a detailed explanation as to how the circuitry of FIG. 8 operates to generate circular arcs. The second position of the selector switch 206 is the "SLOPE" position. In this position, the gating associated with the integrand registers 50, 52 is completely deactivated so that the contents of the integrand registers are not changed as is required during generation of a slope.

The last positions on selector switch 206 are indicated with the notations "Y PAR." and "X PAR." to denote "Y parabola" and "X parabola." For the purposes of explanation, the term "Y parabola" denotes a parabola which is symmetric about the Y-axis and which, as pointed out hereinbefore, requires increasing the velocity of the motion in Y-axis. Similarly, the term "X parabola" is used to denote a parabola which is symmetric about the X-axis and which requires increasing the velocity in the X-axis during generation of the parabolic arc.

If selector switch 206 is in the "X PAR." position, it is necessary to increase the velocity in the X-axis and, as is well known, this is done by increasing the value of the integrand register 50 which is associated with the X-axis. Since the "X PAR." position of selector switch 206 is connected to one input of OR gate 212, the output of OR gate 212 will go to logic "1" at this time. This activates AND gate 214 so that for every pulse generated from gate 160 of FIG. 2, the contents of integrand register 50 are increased by one since the output of AND gate 214 is connected to the "UP" input of integrand register 50.

Similarly, if the selector switch 206 is in the "Y PAR." position, it is necessary to increase the number stored in integrand register 52. This is accomplished by virtue of the fact that the "Y PAR." position of selector switch 206 is connected to one of the inputs of OR gate 218 whose output will, at this time, go to logic "1." When the output of OR gate 218 goes to logic "1,"AND gate 220 is activated so that each pulse from gate 162 of FIG. 2 causes the integrand register 52 to increase since the output of AND gate 220 is connected to the "UP" input of integrand register 52.

The entire foregoing explanation with regard to generation of parabolic arcs has been based on the assumption that the generated arc radiates outwardly from the origin in the manner shown in FIG. 7. It will be appreciated that there are circumstances when it is desirable to generate arcs which rotate in the opposite direction. Under these circumstances, it will be necessary to make certain minor modifications to the circuitry of FIG. 8 so as to account for the two possible directions of rotation. Briefly, these modifications need only be such that the integrand register associated with the axis about which the parabola is symmetric be decreasing from an initial fixed value as the parabola is generated towards the origin. This is easily accomplished by the function generator of FIG. 2 since the integrand registers are reversible and can be varied, either up or down, depending upon the appropriate selection of gating. However, for the sake of simplicity, the foregoing explanation has been limited to parabolas which radiate outwardly from the center with the understanding that this circuit can, as briefly described hereinbefore, be modified so as to perform generation of such parabolic arcs in either direction.

Figure 9:
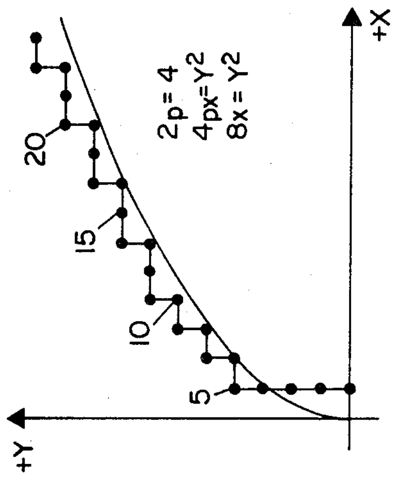
FIG. 9 is a series of waveforms and a graph illustrating the operation of the function generator of FIGS. 2 and 8 demonstrating a parabolic arc.

Turning now to FIG. 9, there is shown a series of waveforms and a graphic illustration of the result of generating a parabolic arc with the numerical function generator of FIG. 2 as implemented by the circuitry of FIG. 8.

Before turning to the waveforms of FIG. 9, it will be recalled that the general equation for a parabola symmetric about the X-axis is:

$$y^2 = 4px.$$

Thus, the initial numerical command for the Y-axis of this parabola is $2p$ and the initial command in the X-axis is zero. If, as in FIG. 9, one wishes to generate the portion of the parabola lying in the first quadrant defined by $y^2 = 8x$, the initial information for Y-axis is $2p = 4$ and the initial information for X-axis is zero. Therefore, the generation of this parabola begins by storing the number 4 in integrand register 52 and zero in integrand register 50.

Turning now to FIG. 9, the function generator of FIGS. 2 and 8 begins with the following initial conditions. The accumulator registers 58, 60 are initially at zero. The X-axis integrand register 50 is also at zero and the Y-axis integrand register 52 begins with the number 4 stored therein. Under these conditions, the initial output of the bit comparator 62 is a logic "1" since the contents of both accumulator registers are zero. Thus, flip-flop 164 is initially in the set state as indicated by the waveform "R2 ≥ R4" in FIG. 9. Upon arrival of the first integrating pulse indicated by waveform "IC," AND gate 162 is activated by flip-flop 164 so that the first step is to add the contents of the Y-axis integrand register 52 to the accumulator register 60.

As a result of the initial additions, the relationship between the two accumulator registers changes so that R4 is now greater than R2 and the output of the bit comparator 62 goes to logic "0" causing the flip-flop 164 to assume the reset state. With flip-flop 164 in the reset state, the second "IC" pulse is routed via AND gate 160 to activate adder 54 so as to add the contents of integrand register 50 to accumulator register 58. The result of this addition is also to generate the first output pulse P1. When output pulse P1 is generated, the contents of integrand register 50 are increased by one since AND gate 214 of FIG. 8 is activated under these circumstances.

The relationship between the accumulator registers has not changed as a result of the second addition so that upon arrival of the third "IC" pulse, the contents of integrand register 50 are once more added to accumulator register 58. This results in generation of the second P1 pulse which is again fed to integrand register 50 so as to increase its contents by one. The remaining waveforms of FIG. 9 can be followed along in this fashion so as to demonstrate the generation of the parabola shown in the graph at the lower half of FIG. 9. As was pointed out hereinbefore, the deviations from the actual desired parabola result from an overmagnification of the scale since the actual units shown therein are ordinarily very small, something in the magnitude of say 0.0001 inch.

Figure 10:
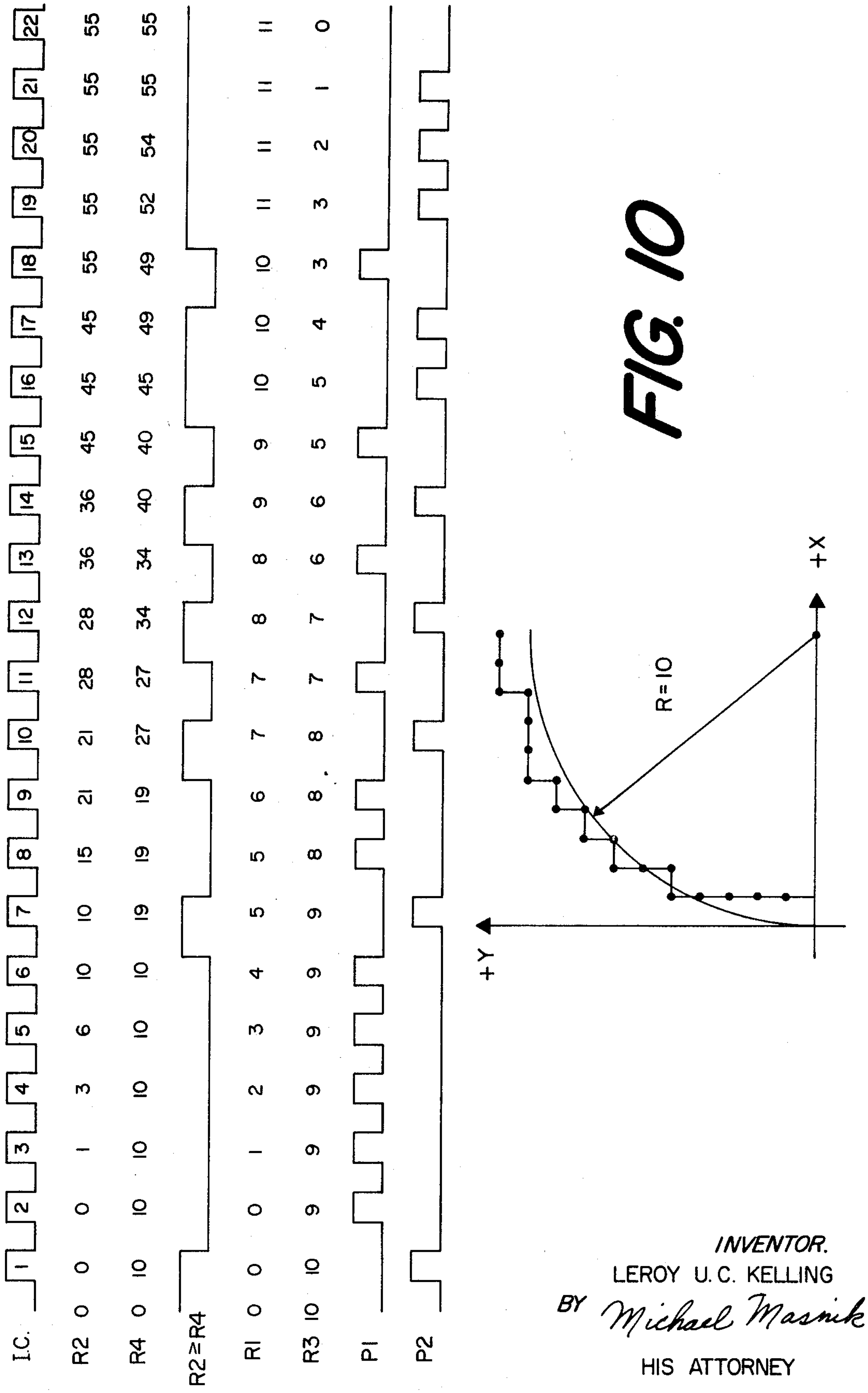
FIG. 10 is a series of waveforms and a graph illustrating the operation of a numerical function generator of FIGS. 2 and 8 to generate a circular arc.

Turning now to FIG. 10, there is shown a series of waveforms identical to those of FIG. 9 with the exception that FIG. 10 demonstrates the use of combined function generator of FIGS. 2 and 8 for generation of a circular arc. The particular arc desired is a clockwise arc into the first quadrant with a radius of 10 units. As was pointed out hereinbefore with respect to FIG. 8, under these circumstances AND gates 214 and 216 will be activated so as to increase the number stored in the integrand register 50 and decrease the number stored in integrand register 52 as the circular arc is generated.

The initial conditions for generation of such an arc are similar to those initially used for generation of parabolic arcs. That is, the accumulator registers 58, 60 are initially at zero and the R2 greater than or equal to R4 flip-flop 164 is initially set since the output of the bit comparator 62 is initially a logic "1" under these circumstances. The actual programming of such an arc is, in somewhat simplified form, determined by locating the center of the arc desired and indicating the offset from the center of the actual starting point. Thus, the center of the arc desired under these circumstances is 10 units to the right on the X-axis so that the initial X offset is ten units and the initial Y offset is zero. Thus, the initial contents of integrand register 52 are the number 10 whereas the initial contents of integrand register 50 are zero because the arc center offset commands are so inverted to produce the correct velocity components.

Upon arrival of the first integrating pulse "IC," the contents of the Y integrand register 52 will be added by adder 56 to accumulator register 60. This results in generating a P2 pulse which causes the contents of the Y integrand register 52 to be decreased by one since AND gate 216 is activated at this time.

Since the relationship between the contents of accumulator registers 58, 60 changes as a result of the first addition, the output of bit comparator 62 changes to a logic "0" so that flip-flop 164 resets. Upon arrival of the second "IC" pulse, the contents of the X integrand register 50 will be added to accumulator register 58 by activation of adder 54. At the same time, the first P1 pulse is generated. The result of generating a P1 pulse is to increase by one the number stored in X integrand register 50 since AND gate 214 (connected to the "UP" input) is activated at this time. At the third "IC" pulse time, a pulse is generated on the P1 waveform which causes the contents of the X integrand register 50 to be increased by one.

The remainder of the waveform of FIG. 10 can be followed through the remaining 19 "IC" pulses so as to show how the rest of the desired arc is generated. Once again, the apparent roughness of the generated arc can be deceiving since the size of the units used on ordinary machine tools is very small, ordinarily somewhere around 0.0001 inch.

This concludes the detailed description of the present invention. At least two other points, however, should be made. The first point is that all of the numerical functions generated as examples herein have begun at the origin, radiating outwardly so as to simplify the actual explanation of the function generator. It will be appreciated, of course, that the circular arcs generated need not necessarily begin at the origin, but rather can begin at any desired point on the generated curve by appropriately selecting the desired input information which is initially stored in the integrand registers.

In addition, some of the apparent inaccuracies of the function generator of the present invention can be mitigated by adding some additional circuitry to the bit comparator 62. This additional circuitry could be used, for example, to control what the function generator does when the two accumulator registers 58, 60 are precisely equal to one another. That is, the embodiment of FIG. 2, for the sake of simplicity, has been described indicating that when the contents of the two accumulator registers are equal, the result will be to activate adder 56. There may be circumstances where the nature of the generated curve and the nature of the initial input information are such that it would be desirable when both accumulator registers are equal to instead activate adder 54. With the addition of the circuitry necessary to accomplish this result, some of the apparent roughness and inaccuracy of the function generator of the present invention can be obviated.

Although the present invention has been described with respect to several particular embodiments, the principles underlining this invention will undoubtedly suggest many additional modifications of these particular embodiments to those skilled in the art. Therefore, it is intended that the appended claims shall not be limited to the specific embodiments shown, but rather shall cover all such modifications as fall within the true spirit and scope of the present invention.

What I claim as new and desire to secure by Letters Patent of the United States is:

1. A numerical function generator comprising:

a. first and second digital storage means for storing first and second digital numbers, the ratio of said first and second digital numbers being proportional to the instantaneous slope of the function to be generated;

b. first and second digital accumulator registers;

c. a first digital adder operatively connected to said first digital storage means and to said first digital accumulator register, said first digital adder being operative to add the digital number stored in said first digital storage means to the digital number stored in said first digital accumulator register;

d. a second digital adder operatively connected to said second digital storage means and to said second digital accumulator register, said second digital adder being operative to add the digital number stored in said second digital storage means to the digital number stored in said second digital accumulator register;

e. comparison means operatively connected to said first and second digital accumulator registers, said comparison means being operative to compare the digital numbers stored in said first and second digital accumulator registers and being further operative to generate an output signal indicating the relative size of said digital numbers stored in said first and second digital accumulator registers; and f. adder control means operatively connected to said comparator means and to said first and second digital adders, said adder control means being operative to activate said first digital adder whenever the output of said comparator means is in a first state and being further operative to activate said second digital adder when the output of said comparator means is in a second state.

2. The numerical function generator recited in claim 1 further comprising first and second pulse generating means operatively connected to said adder control means, said first pulse generating means being operative to generate a first pulse frequency digital signal whenever said first digital adder is activated and said second pulse generating means being operative to generate a second pulse frequency digital signal whenever said second digital adder is activated whereby the ratio of said second pulse frequency digital signal to said first pulse frequency digital signal is proportional to the ratio of said first digital number to said second digital number.

3. The numerical function generator recited in claim 1 further comprising modifying means operatively connected to said first and second digital storage means for modifying said first and second digital numbers in response to the operation of said first and second digital adders.

4. The numerical function generator recited in claim 2 further comprising modifying means operatively connected to said first and second digital storage means for modifying said first and second digital numbers in response to the operation of said first and second digital adders.

5. The numerical function generator recited in claim 3 wherein said first and second digital storage means comprise first and second integrand registers.

6. The numerical function generator recited in claim 4 wherein said first and second digital storage means comprise first and second integrand registers.

7. The numerical function generator recited in claim 3 wherein said first and second digital storage means comprise first and second reversible storage registers having first and second input means whereby the digital numbers stored therein may be selectively increased or decreased by a predetermined amount.

8. The numerical function generator recited in claim 4 wherein said first and second digital storage means comprise first and second reversible storage registers having first and second input means whereby the digital numbers stored therein may be selectively increased or decreased by a predetermined amount.

9. The numerical function generator recited in claim 7 wherein said modifying means is further operative to increase the number stored in one of said reversible storage registers and to decrease the number stored in the other of said reversible storage registers so as to generate a circular function.

10. The numerical function generator recited in claim 8 wherein said modifying means is further operative to increase the number stored in one of said reversible storage registers and to decrease the number stored in the other of said reversible storage registers so as to generate a circular function.

11. The numerical function generator recited in claim 7 wherein said modifying means is further operative to modify the digital numbers stored in one of said reversible storage registers while maintaining the number stored in the other of said reversible storage registers substantially constant so as to generate a parabolic function.

12. The numerical function generator recited in claim 8 wherein said modifying means is further operative to modify the digital numbers stored in one of said reversible storage registers while maintaining the number stored in the other of said reversible storage registers substantially constant so as to generate a parabolic function.

13. The numerical function generator recited in claim 7 further comprising means for deactivating said modifying means so as to maintain the digital numbers stored in said first and second reversible storage registers substantially constant so as to generate a linear function.

14. The numerical function generator recited in claim 8 further comprising means for deactivating said modifying means so as to maintain the digital numbers stored in said first and second reversible storage registers substantially constant so as to generate a linear function.

15. A method of generating numerical functions comprising the steps of:

a. providing first and second digital numbers indicative of the instantaneous slope of the numerical function to be generated;
b. storing said first and second digital numbers in first and second digital storage registers;
c. adding the contents of one of said digital storage registers to the contents of a first digital accumulator register;
d. comparing the contents of said first digital accumulator register with the contents of a second digital accumulator register; and
e. adding said contents of said second digital storage register to said second digital accumulator register if the contents of said second digital accumulator register are less than the contents of said first digital accumulator register or adding the contents of said first digital storage register to said first digital accumulator register if the contents of said first digital accumulator register are less than the contents of said second digital accumulator register.

16. The method recited in claim 15 including the additional step of modifying the contents of at least one of said digital storage registers in response to each step of comparing the contents of said first and second digital accumulator registers.

17. The method recited in claim 16 wherein the step of modifying the contents of said first and second digital storage registers comprises the steps of increasing the digital numbers stored in one of said digital storage registers and decreasing the digital numbers stored in the other of said digital storage registers so as to generate a circular function.

18. The method recited in claim 16 wherein the step of modifying the contents of said first and second digital storage registers comprises the steps of modifying the contents of one of said digital storage registers while maintaining the contents of the other of said digital storage registers substantially constant so as to generate a parabolic function.

* * * * *